US009756031B1

(12) United States Patent
Roth et al.

(10) Patent No.: US 9,756,031 B1
(45) Date of Patent: *Sep. 5, 2017

(54) PORTABLE ACCESS TO AUDITING INFORMATION

(71) Applicant: Amazon Technologies, Inc., Seattle, WA (US)

(72) Inventors: Gregory B. Roth, Seattle, WA (US); Cristian M. Ilac, Sammamish, WA (US); James E. Scharf, Jr., Seattle, WA (US); Nathan R. Fitch, Seattle, WA (US); Graeme D. Baer, Seattle, WA (US); Brian Irl Pratt, Seattle, WA (US); Kevin Ross O'Neill, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,147

(22) Filed: Oct. 13, 2014

Related U.S. Application Data

(63) Continuation of application No. 13/333,933, filed on Dec. 21, 2011, now Pat. No. 8,881,256.

(51) Int. Cl.
*H04L 29/06* (2006.01)
*G06F 21/00* (2013.01)
*H04L 29/08* (2006.01)

(52) U.S. Cl.
CPC .......... *H04L 63/08* (2013.01); *H04L 63/0428* (2013.01); *H04L 67/22* (2013.01)

(58) Field of Classification Search
CPC .......................... G06F 21/123; G06C 20/3821
See application file for complete search history.

(56) References Cited

U.S. PATENT DOCUMENTS 5,016,276 A * 5/1991 Matumoto ............ H04L 9/0847
380/44
5,749,075 A * 5/1998 Toader .................. G06Q 20/04
705/14.19

(Continued)

OTHER PUBLICATIONS

U.S. Appl. No. 13/333,933, "Final Office Action", Mar. 10, 2014, 12 pages.

(Continued)

*Primary Examiner* — Oleg Korsak
*Assistant Examiner* — Simon Kanaan
(74) *Attorney, Agent, or Firm* — Kilpatrick Townsend & Stockton LLP

(57) ABSTRACT

Systems and methods provide a storage media on a portable physical object associated with a set of credentials that enables access to a set of computing resources associated with a set of Web services. In some embodiments, information including a set of credentials is prepackaged onto the storage media of the portable physical object. A pre-activated subscription to the set of Web services in a distributed system is provisioned. Access to the set of Web services is enabled when the portable physical object is coupled with a computing device and the set of credentials is authenticated. In some embodiments, the portable physical object is purchased by a user on a prepaid basis without requiring the user to register an account with the set of Web services, allowing the user to remain anonymous with respect to interaction with the set of Web services.

20 Claims, 7 Drawing Sheets

(56) References Cited

U.S. PATENT DOCUMENTS

| | | | |
|---|---|---|---|
| 8,245,037 B1 | 8/2012 | Durgin et al. | |
| 8,819,768 B1* | 8/2014 | Koeten | H04L 41/022 380/270 |
| 9,026,080 B2* | 5/2015 | Moran | H04W 12/06 380/44 |
| 9,274,707 B2* | 3/2016 | Kaiser | G06F 17/30581 |
| 2003/0069673 A1* | 4/2003 | Hong | B60R 25/2081 701/33.3 |
| 2004/0205004 A1* | 10/2004 | Bahl | G06Q 20/3674 380/44 |
| 2006/0072745 A1* | 4/2006 | Fukaya | G06F 21/606 380/28 |
| 2006/0165005 A1* | 7/2006 | Frank | G06Q 30/0284 370/250 |
| 2006/0206932 A1 | 9/2006 | Chong | |
| 2006/0277285 A1* | 12/2006 | Boyd | H04L 67/14 709/223 |
| 2008/0155198 A1* | 6/2008 | Factor | G06F 12/0804 711/143 |
| 2008/0208927 A1* | 8/2008 | Chikusa | G06F 3/0605 |
| 2008/0250250 A1* | 10/2008 | Westerinen et al. | 713/189 |
| 2009/0077636 A1* | 3/2009 | Duffie, III | G06F 21/335 726/5 |
| 2010/0293383 A1 | 11/2010 | Coughlin et al. | |
| 2010/0332401 A1* | 12/2010 | Prahlad | G06F 17/3002 705/80 |
| 2011/0041126 A1* | 2/2011 | Levy et al. | 718/1 |
| 2011/0211548 A1* | 9/2011 | Russel | 370/329 |
| 2012/0209745 A1* | 8/2012 | Spencer, II | G06Q 20/327 705/26.41 |

OTHER PUBLICATIONS

U.S. Appl. No. 13/333,933 , "Non-Final Office Action", Jun. 26, 2013, 16 pages.

U.S. Appl. No. 13/333,933 , "Notice of Allowance", Jul. 18, 2014, 17 pages.

* cited by examiner

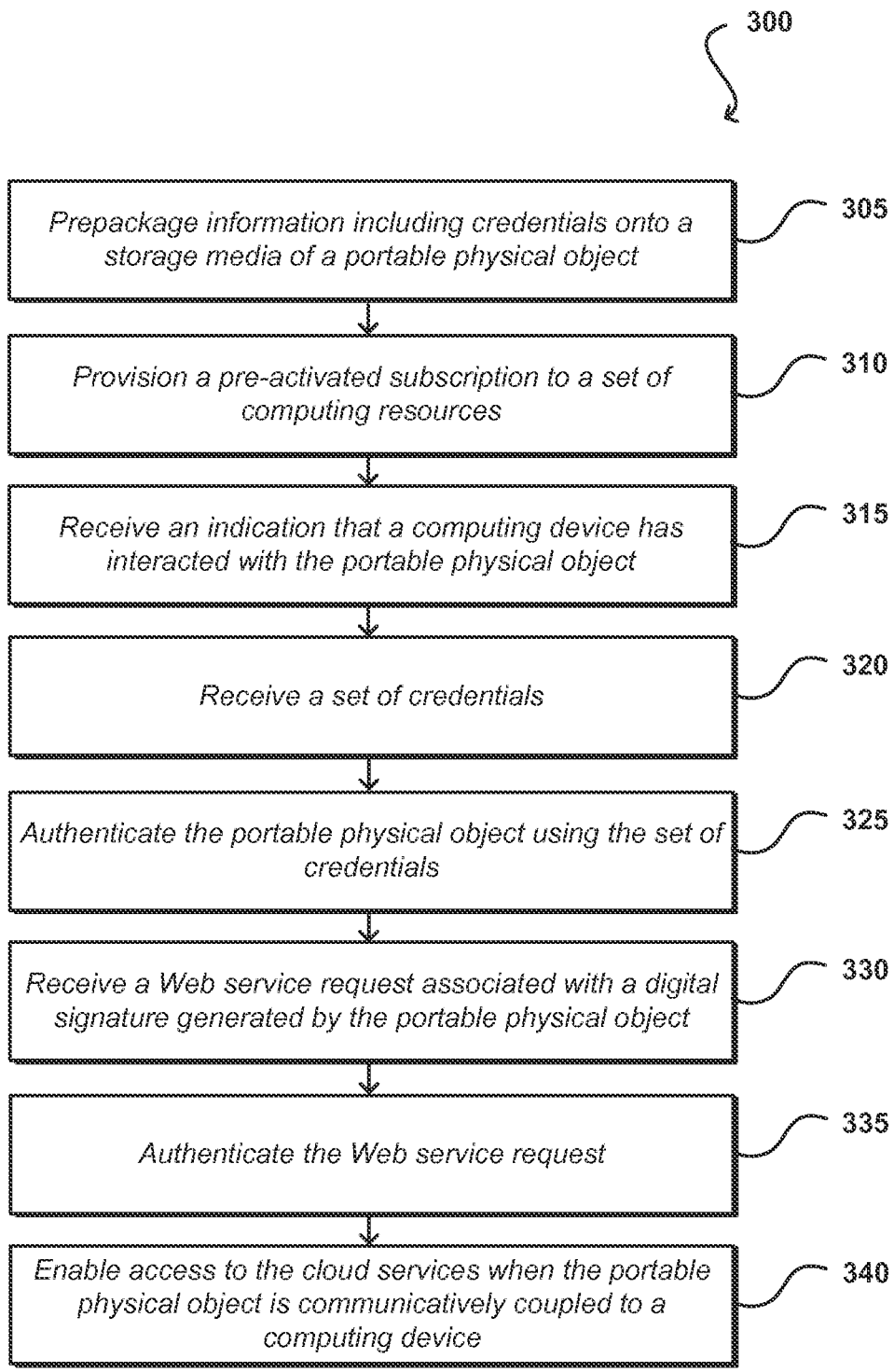

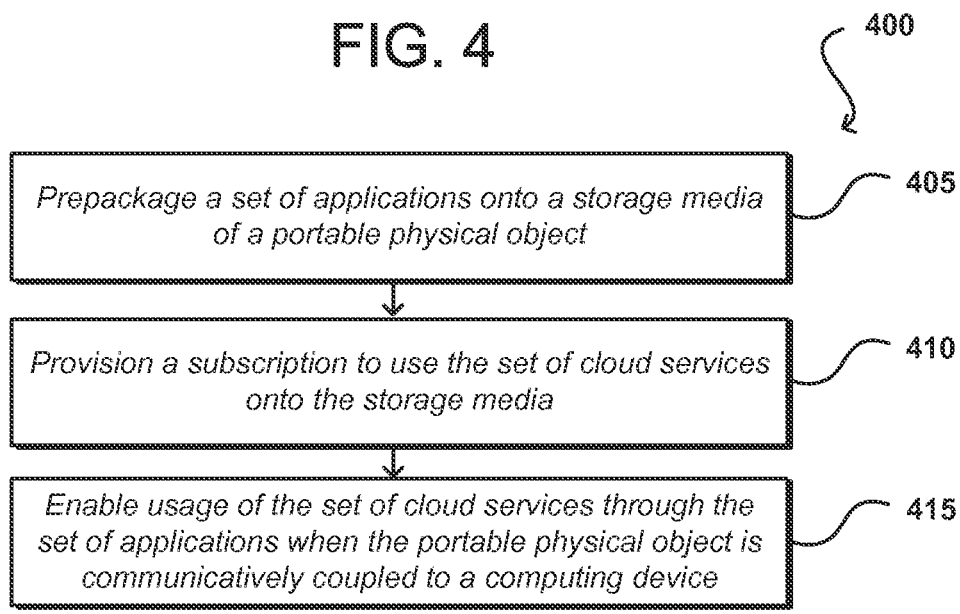
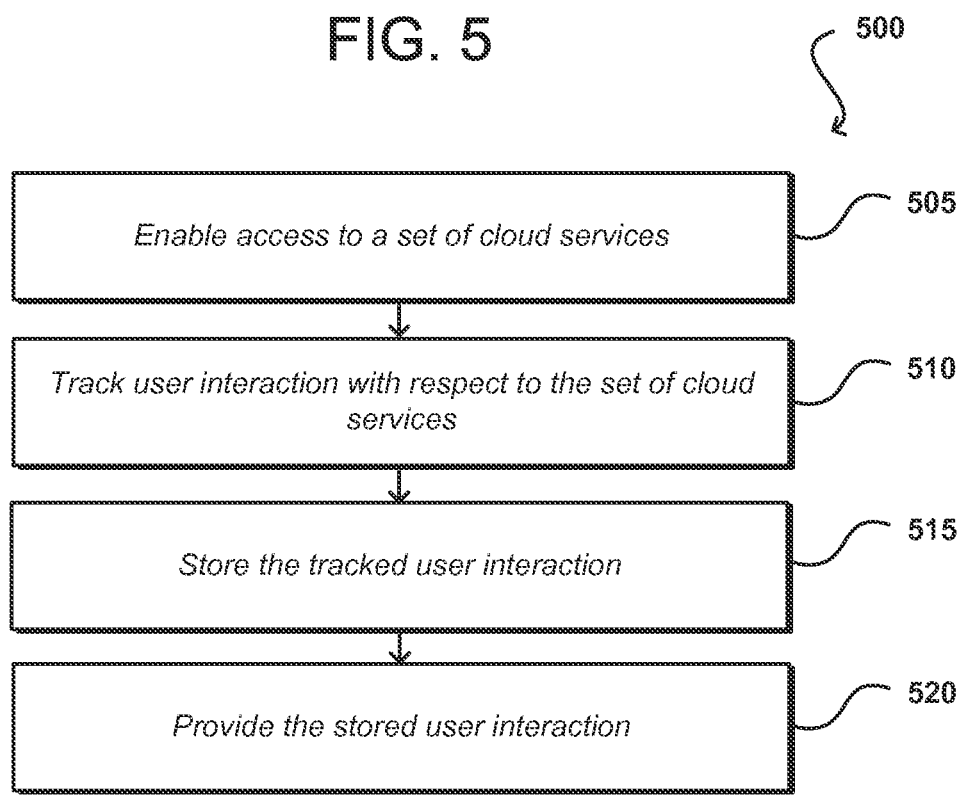

PORTABLE ACCESS TO AUDITING INFORMATION

CROSS-REFERENCES TO RELATED APPLICATIONS

This application is a continuation of U.S. patent application Ser. No. 13/333,933, filed Dec. 21, 2011, titled "PORTABLE ACCESS TO AUDITING INFORMATION", the full disclosure of which is incorporated herein by reference.

BACKGROUND

As an increasing number of applications and services are being made available over networks such as the Internet, an increasing number of content, application, and/or service providers are turning to technologies that provide access to electronic resources through services, such as Web services. A user or customer typically will rent, lease, or otherwise pay for access to resources implemented by third parties, i.e. "in the cloud," and thus does not have to purchase and maintain the hardware and/or software to provide access to these resources.

Customers typically need to register an account with an entity that governs these resources in order to obtain access to the resources "in the cloud." Customers who prefer to be anonymous or who prefer not to create an account are forced to identify themselves and provide various personal information including billing information. Requiring the customer to enter his or her billing information may subject the customer to charges from resource usage that the customer has no control over. There is a need for convenient ways of accessing computing resources, software, and information provided to customers as a utility over a network.

BRIEF DESCRIPTION OF THE DRAWINGS

Various embodiments in accordance with the present disclosure will be described with reference to the drawings, in which:

FIG. 3 illustrates an example of process for enabling access to one or more computing resources in a distributed environment in accordance with some embodiments;

FIG. 4 illustrates an example of process for providing access to a set of Web services in accordance with some embodiments;

FIG. 5 illustrates an example of process for providing a secure audit log for usage of a set of Web services in accordance with some embodiments;

DETAILED DESCRIPTION

Figure 1:
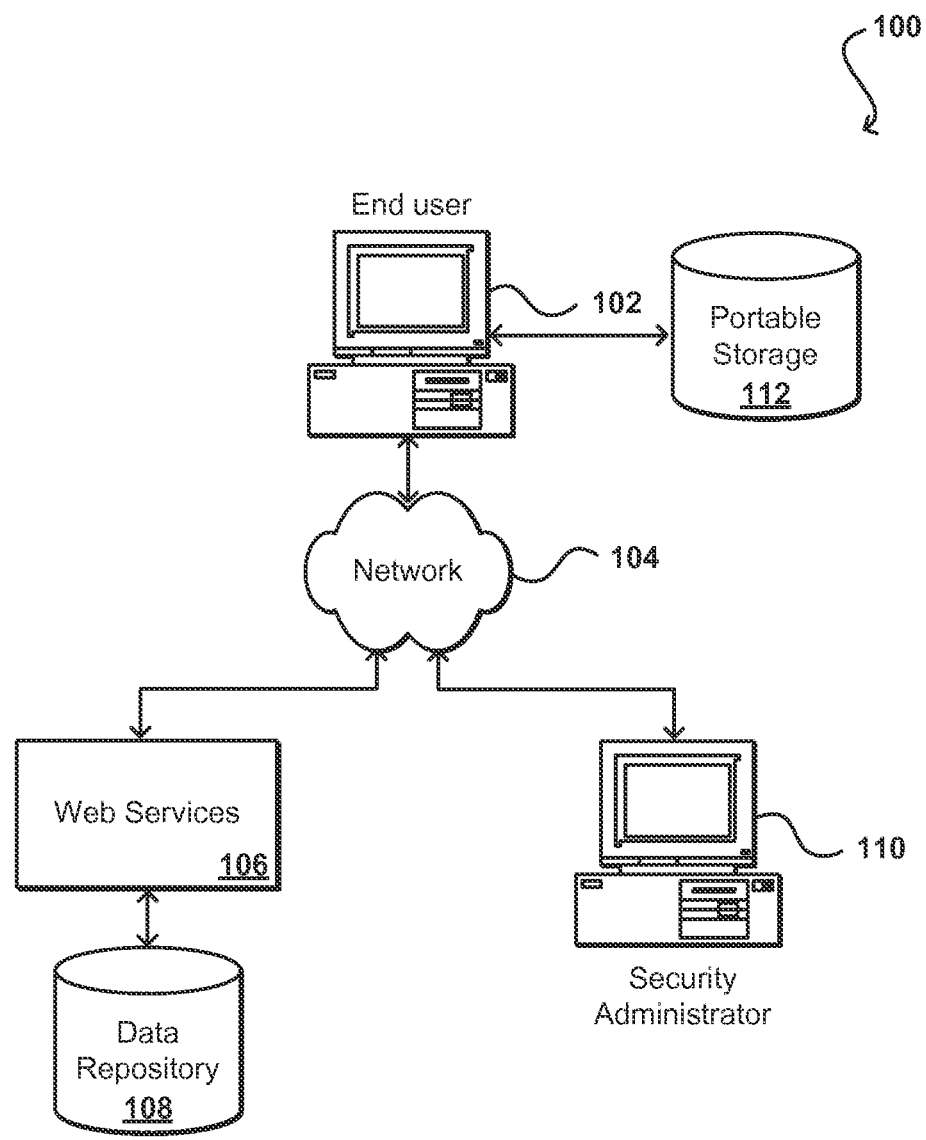
FIG. 1 illustrates an example of a network configuration that can be used in accordance with one embodiment.

Systems and methods in accordance with various embodiments of the present disclosure may overcome one or more of the aforementioned and other deficiencies experienced in conventional approaches to providing access to data in an electronic environment. In particular, various embodiments provide a portable storage media with credentials that enables a user to access computing resources through computing resource services, such as Web services. For example, a universal serial bus (USB) flash drive may be provisioned with a pre-activated subscription to one or more computing resource services to enable user access to computing resources upon inserting the USB flash drive into a computing device. Computing resource services may include one or more computing resources accessible across a network through an application programming interface (API) or other interface where the one or more computing resources are scalable and expandable to provide the capacity needed for the user.

In some embodiments, the portable storage media provides a pre-activated subscription to the Web services, thereby not requiring a user to register or activate an account. Having a subscription to Web services allows the user to access the Web services for a certain period of time (e.g., a two month flat-fee subscription) or for a certain usage amount for a period of time (e.g., 120 GB of storage space, 100 hours of server time per month). Some embodiments enable a user to purchase the portable storage media and pre-pay for a limited amount of Web services accessible while using the portable storage media.

A user or customer can access Web services or a set of computing resources through an externally visible application programming interface (API), for example, which can be analyzed to determine actions to be performed using the set of computing resources. Some embodiments may pre-package a software development kit and/or various applications that may provide access to a set of Web services on the portable storage media. In some embodiments, information prepackaged onto the portable storage media may include Web services security credentials (e.g., security tokens issued by Security Token Service (STS)). The embedded credentials enable the user to have a pre-registered account for various Web services such that the user may access functionalities of the Web services anonymously.

In some embodiments, the portable storage media may be a physical object such as a smartcard, a subscriber identification module (SIM) card, a secure digital (SD) card, etc. Some embodiments enable the user to access Web services through a software application (e.g., an Web browser client) installed on the portable storage media. In some embodiments, the portable storage media enables the user to use applications (e.g., a backup application) that are installed locally on the computing device or operating on a remote server to access a set of Web services. The portable storage media of some embodiments provides cryptographic capability as the set of credentials associated with the portable storage media is non-transferable. While the set of credentials are associated with the portable storage media, the user may access the same environment as the user connects the portable storage media with different computing devices.

Systems and methods in accordance with various embodiments provide a portable storage media on a physical object within which a set of credentials associated with the portable storage media is embedded. The amount of Web services accessible through the portable storage media on the physical object is limited by a predetermined amount in some embodiments. In some embodiments, the usage amount may be increased upon adding more money into the account associated with the portable storage media. Some embodiments enable the user to query for the current usage and the amount remaining to determine whether to increase the allotted usage amount.

Some embodiments provide a portable storage medium that can track and record the usage of a set of computing resources by the user using audit logs. In some embodiments, tracking and recording the user's interaction and usage of various applications and functionalities in Web services that manage a pool of computing resources on the portable storage media increases the security of the usage of the Web services. Some embodiments enable the user to register an account including the user's personal information while some embodiments enable the user to have anonymous usage of the Web services. In some embodiments, the audit log recordings of usage of the set of computing resources managed by the Web services may be limited by a prepaid amount. Some embodiments enable the user to create an account and setup a post-paid method which allows the user to extend the usage of the set of computing resources associated with this account beyond that originally allotted to the portable storage media when purchased.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example of a network configuration 100 that can be used in accordance with one embodiment. In this example, an end user device or a client device 102 is able to connect through a network 104 to access at least one host or server 106. The end user device might have access to at least one portable storage device 112. The portable storage device may be a USB drive, an SD card, a smartcard, etc. In some embodiments, the portable storage device enables a user of the end user device to access a set of Web services managing a pool of computing resources by providing a subscription to the Web services. The amount of Web services usage is limited by an amount that is associated with the portable storage device at the time that the portable storage device was purchased. For example, the amount of storage services that is usable by the user may be $10 worth of storage services paid for by the user. Upon reaching the assigned usage limit, the user may be unable to continue accessing the account associated with the portable storage device and its contents unless the user recharges the account.

In some embodiments, the portable storage device has at least a set of credentials stored on the portable storage device. The set of credentials may be a shared secret key, a symmetric key, an asymmetric key, RSA key, certificate, etc. The portable storage device of some embodiments provides cryptographic functionality using the set of credentials to authenticate the user (e.g., when the portable storage device is activated). In some embodiments, the portable storage device is activated when the portable storage device is inserted into a computing device of the user. The user may be prompted to enter a pin set by the user the first time that the user inserted the portable storage device into a computing device in some embodiments. Some embodiments enable the user to enter a pin that came along with the portable storage device when the storage device was purchased (e.g., a pin that was printed on a gift card). The user may be required to enter the pin when the user subsequently inserts the portable storage device to another computing device in some embodiments.

In some embodiments, the one or more servers 106 might have access to at least one data repository 108 (e.g., distributed cache(s), Berkeley database (BDB)) for use in serving requests from the user device 102 and for storing one or more shared secret keys or authentication seeds. The server and the user device may share one or more authentication seeds for authentication. The authentication seed on the user device may be an initial sequence bootstrapped onto the user device prior to a user receiving the user device in some embodiments. The user of the user device may have obtained the authentication seed by scanning a barcode or a quick response (QR) code, typing in a series of characters, extracting it from an email, etc. In some embodiments, the data stored in storages 108 and 112 are stored in one physical storage (e.g., a hard disk, random access memory (RAM), etc.). In other embodiments, the various data are stored in separate physical storages (e.g., different types of storages, different disks, etc.), or more than one type of data are stored in one physical storage while the others are in different physical storages. In addition, one or more of the sets of data might be spread across multiple physical storages.

There can be several types of security used with respect to the user device 102 and the server 106 or database 108, which may be controlled by a security administrator device 110 able to configure and manage security for the server, host, and any related components. For example, the user might send a request for content or a resource that needs to be decrypted by the server 106. In another example, the server might require secure authentication of the user device 102 in order to provide access to services or functionality provided by the server, and may require different security criteria to access and/or store data in the data repository 108. Further, any service and/or application may also require separate security criteria. Various other types of security can be utilized as discussed and suggested elsewhere herein.

Figure 2:
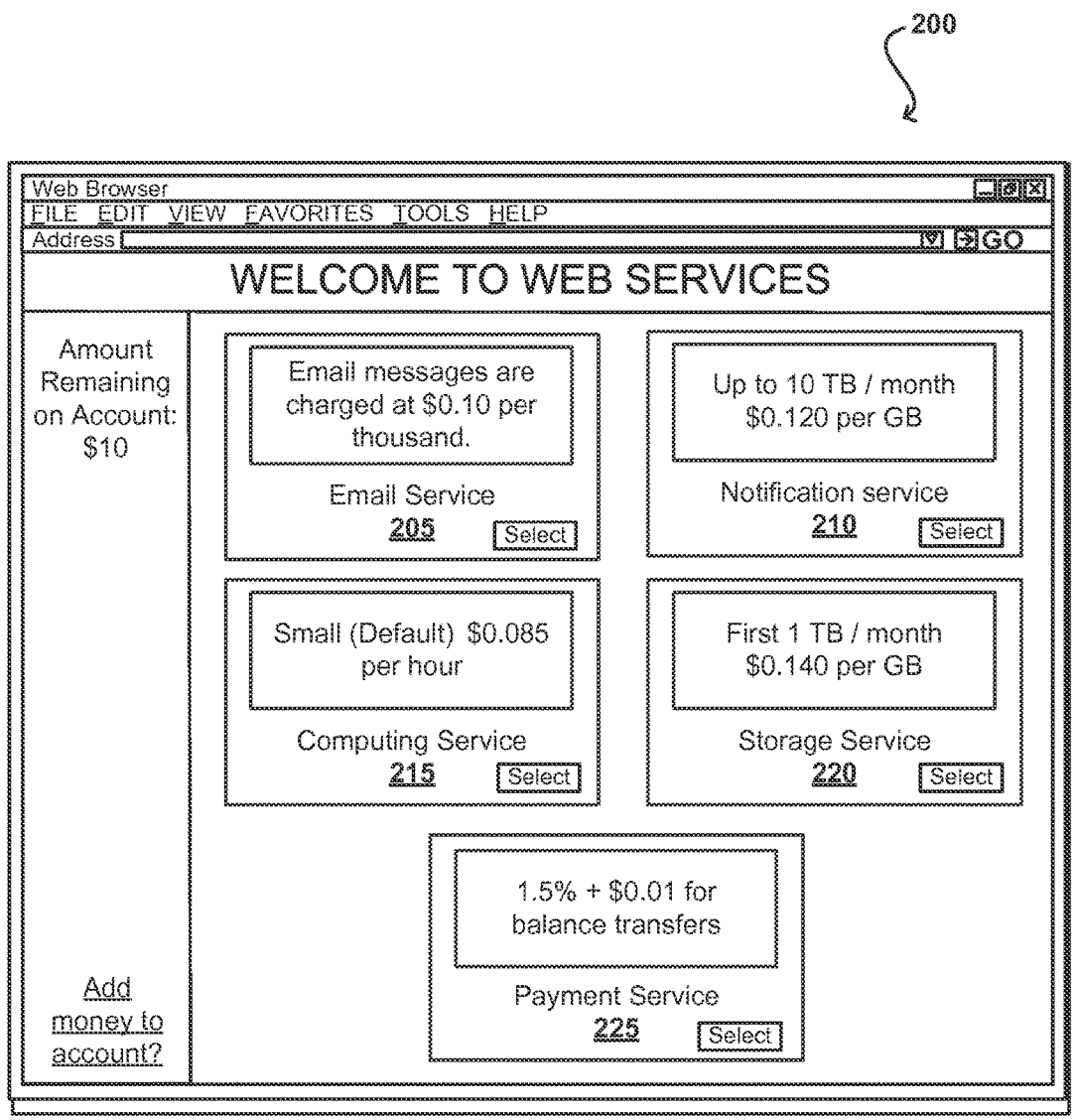
FIG. 2 illustrates an example of an interface page that can be displayed to a user where the user may specify which applications and services the user would like to use in accordance with some embodiments.

A customer can be provided with an application and/or interface that allow the customer to access and utilize various Web services. For example, FIG. 2 illustrates an example of an interface page 200 that can be displayed to a user where the user may specify which applications and services the user would like to use. In this example, a welcome page is displayed to the customer upon the customer communicatively coupling the portable storage medium with a computing device of the customer. For example, an application stored on the portable storage medium may launch and display the welcome page or home page upon the customer's inserting a USB stick into a computing device.

The customer is provided with user-selectable user interface (UI) elements 205-225 enabling the customer to select from a number of available Web services through which the customer would like to access one or more computing resources. In this example, a number of Web services are available for selection, such as an email service 205 that provides bulk email sending, a notification service 210 that provides messaging services, a virtual computing service 215 that enables users to create, launch, and terminate server instances, a storage service 220 that provides Web Service based storage, and a payment service 225 that provides an interface for payments. Various embodiments may have different combination of different types of Web services.

In some embodiments, a customer can see the amount of money remaining on the portable storage device that the customer may apply towards usage of the Web services. In some embodiments, the customer may increase the amount of money left on the portable storage device such that the customer may continue to use the Web services through the same set of credentials provided by the portable storage device by inputting personal billing information. In this example, the customer may select a user-selectable UI item 240 that enables the customer to add money to the account.

FIG. 3 illustrates an example of process 300 for enabling access to one or more computing resources in a distributed system in accordance with some embodiments. In some embodiments, upon interaction between the portable storage 112 described in FIG. 1 and the end user system 102, access to one or more computing resources may be enabled for a user. In this example process illustrated in FIG. 3, information is prepackaged onto a storage media of a portable physical object 305. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some embodiments, the information includes a set of security credentials for accessing the Web services. The security credentials may include a certificate or a shared secret key (e.g., asymmetric keys such as RSA keys, symmetric keys). Each portable physical object may have an associated security credentials bootstrapped onto the portable physical object. In this example, a pre-activated subscription to a set of Web services utilizing a set of computing resources in a distributed system is provisioned onto the portable physical object 310.

In some embodiments, a Web service enables communication or machine-to-machine interaction over a network. Examples of Web services may include storage services, email services, backup services, queue services, relational database services, authentication services, application deployment and management services, virtual computing services, etc. Some embodiments provision a pre-activated subscription to the storage media of the portable physical object such that the customer needs not create and activate an account. The customer may have access to the set of computing resources as an anonymous user and without having to register account information with the set of Web services. In some embodiments, the portable physical object is bought by and sold to a user on a prepaid basis without requiring the user to create a billing account or submit billing information with the set of Web services. In such embodiments, the usage subscription to the set of Web services may be limited to a prepaid amount by the user.

In this example, an indication that a computing device has interacted with the portable physical object is received over a network 315. A set of credentials may be stored on a storage medium that is part of the portable physical object. In some embodiments, the indication is provided when the computing device is communicatively coupled to the portable physical object. The computing device and the portable physical object is communicatively coupled when the portable physical object is mechanically coupled to or inserted into the computing device in some embodiments.

It should be noted that, for the purpose of illustration, insertion of the portable physical object into a computing is described. However, various embodiments may utilize various other types of interaction between a computing device and a portable physical object and such interaction does not necessarily include the insertion of the object into the computing device or even contact with the computing device. Generally, any suitable manner of passing information from the portable physical object to the computing device may be used. For instance, some embodiments may enable access to a set of computing resources upon receiving a signal (e.g., from near field communication (NFC) indicating that a computing device has interacted with an radio-frequency identification (RFID) chip on a card, or a barcode, or a QR code, etc.

The set of credentials is received as a result of interaction between the computing device and the portable physical object 320. The portable physical object is then authenticated using the set of credentials 325. Access to the set of computing resources is enabled when the portable physical object is successfully authenticated 330. In some embodiments, access is enabled only when a Web service request received from the computing device is authenticated. While in some embodiments, authentication of the portable physical object is a necessary prerequisite to enabling access to the set of computing resources, some embodiments enable access upon authenticating a Web service request associated with a prepaid account using a set of credentials (e.g., generated from an application on a mobile device, a smartphone, a portable key generation object).

In some embodiments, user access to the set of computing resources is limited to the prepaid subscription associated with the portable physical object. As described, the prepaid subscription may limit the usage of the set of resources by allowing the user to use the set of resources for a limited amount of time (e.g., one month subscription, 30-minute subscription), by allowing the user to use a subset of the set of resources for a duration of time, by allowing the user to use the set of computing resources up to a threshold amount of data transfer, by allowing the user to use the set of computing resources at their respective web service rate up to a certain dollar amount, etc. The user may extend the subscription or increase the usage amount by setting up a post-pay account or by inputting billing information such that the user may continue to use the account associated with the portable physical object upon expiration of the original subscription.

In some embodiments, a Web service request is received from the computing device 335. The Web service request may be associated with a digital signature generated by a signing module running on the portable physical object. In some embodiments, the digital signature is generated using at least one of the set of credentials on the portable physical object. The set of credentials may remain on the portable physical object without allowing the computing device to have access to the set of credentials. By preventing the computing device from accessing the credentials, a security benefit is achieved by making it more difficult to utilize the credentials to sign requests without the portable physical object. The Web service request may then be authenticated based at least in part on the digital signature 340. In some embodiments, the computing device generates the digital signature associated with the Web service request using a set of keys stored on the computing device itself or retrieved from the portable physical object.

In some embodiments, the portable physical object may perform transparent encryption such that some or all of the data that is part of the Web service request may be encrypted. The portable physical object may store and utilize a set of encryption keys such that data being transmitted to the set of Web services is encrypted by the portable physical object prior to transmission. This enables the user to remain completely anonymous and the data to remain secure as the data is encrypted by the portable physical object. Further, in some embodiments, envelope encryption may be performed to ensure the secure transfer of a set of keys. In performing envelope encryption, a set of keys used to encrypt the data associated with the Web service request may be encrypted using another set of keys included in the set of credentials stored on the portable physical object. Various other security mechanisms may be further applied to ensure the secure transmission of data (e.g., where the provider cannot access the data) and the necessary credentials to the appropriate set of Web services for the set of Web services to process the request while allowing the user remains anonymous in some embodiments.

Some embodiments enable more than one portable physical objects to be linked with each other (e.g., by specifying upon purchase of the portable physical objects). In some embodiments, two or more portable physical objects may share the same set of credentials and thereby access the same subscription to the Web services. Each of the linked portable physical objects operates under the same security container in some embodiments where any information accessible by one of the linked portable physical objects is also accessible by another one of the linked portable physical objects. Access to the same set of services and information for that account may be obtained by using any of the portable physical objects. This may be useful in a situation where a team of developers are working on the same application. By linking the objects or devices, the prepaid cap may be the total congregated amount from each of the objects. Some embodiments may recharge the total amount that may be expended from usage of the Web services by each of the linked portable physical objects from any one of linked portable physical objects.

In some embodiments, linked portable physical objects may be assigned to different security groups where each security group is associated with a different amount of access privileges. For instance, one of the linked portable physical objects within a number of portable physical objects may be designated the ability to recharge or to cancel the account. Further, some embodiments enable a customer to register the portable physical object to obtain a back-up key such that the customer may recover account information associated with the portable physical object in the event that the customer loses the portable physical object. While the set of credentials used to authenticate the portable physical object, to encrypt and/or sign the data included in the Web service requests, to encrypt the keys used to encrypt the data is described as being prepackaged onto the portable physical object prior to a user obtaining or purchasing the portable physical object, various embodiments may allow the portable physical object to obtain the set of credentials in other ways, such as the set of credentials being created upon interaction between the portable physical object and a computing device.

Some embodiments enable the set of computing resources managed by a set of Web services to be accessible for a threshold duration of time beyond the duration in which the portable physical object is inserted into the computing device. In some embodiments, the set of computing resources is only accessible for the duration of time that the portable physical object is inserted into the computing device. Some embodiments enable the user to view the current usage and amount of money remaining on the prepaid portable physical object when queried by the user. The user may then recharge the portable physical object upon entering billing information of the user. Some embodiments enable the user to convert the portable physical object from being in a prepaid mode to a post-pay mode (e.g., upon the user registering an account).

It should be noted that, for the purpose of illustration, a prepaid subscription associated with a portable physical object paid for at the time of obtaining the portable physical object (e.g., when the user pays for the portable physical object associated with a subscription at a physical store e.g., by using cash) as the method of payment is described. However, various embodiments may utilize various other ways to enable a user to obtain or purchase a subscription to a set of Web services without having his or her identity compromised. For instance, Web services that maintain a digital currency system that enable a user to transfer digital currency in exchange for a subscription can be used. Such systems enable the user to remain relatively untraceable while obtaining digital currency that may be used to purchase a subscription to the set of Web services.

FIG. 4 illustrates an example of process 400 for providing access to a set of Web services in accordance with some embodiments. In this example, a set of applications that enable a customer to access a set of computing resources in a distributed system is prepackaged onto a storage media of a portable physical object 405. While some embodiments may prepackage the set of applications onto the storage media of the portable physical object, some embodiments enable the customer to use applications that are stored locally on a computing device. Some embodiments enable the customer to use applications that are stored remotely in a distributed environment. As mentioned, the set of Web services in some embodiments includes one or more computing resources accessible across a network through an API or other interface. In some embodiments, the one or more computing resources are scalable and expandable to provide the capacity needed for the user.

A subscription to use the set of Web services is provisioned onto the storage media of the portable physical object 410. In some embodiments, the usage cap or the pre-activated subscription may be determined based at least in part on an amount prepaid by the customer. The usage of the set of Web services through the set of applications is automatically enabled when the portable physical object is inserted into a computing device 415. In some embodiments, the portable physical object is purchased by the customer on a prepaid basis without requiring the customer to register personal information with the set of Web services.

In some embodiments, security credentials are associated with the portable physical object, such as a certificate, a symmetric key, an asymmetric key, or an RSA key. A security administrator or a server may then authenticate the portable physical object using the associated security credentials. Further, the customer may associate a password with the portable physical object such that contents of the portable physical object is inaccessible without entering the password. This serves as an extra layer of security preventing unauthorized persons from accessing an account associated with the portable physical object. Thus, the customer may use the portable physical object (e.g., by inserting the portable physical object into a computing device) on computing devices in addition to the computing device of the customer without being at risk of a security breach.

FIG. 5 illustrates an example of process 500 for providing a secure audit log for usage of a set of computing resources associated with a set of Web services in accordance with some embodiments. Secure audit logging records the user's actions on content (e.g., changes that are made to the set of computing resources shared by the one or more servers) and enables detection of tampering with the logs. The audit log is useful for detecting and comprehending tampering with the network system. In this example, customer access to a set of Web services is enabled when the customer inserts a portable physical object into a computing device 505.

Some embodiments enable the customer to have access to the set of Web services when the portable physical object is inserted into the computing device for the duration of portable physical object being inserted into the computing device. In some embodiments, the customer may have access to the set of Web services a threshold period of time beyond the customer inserting the computing device into a computing device such that many users can share and use the set of computing resources associated with the same account at the same time. As discussed, instead of inserting the portable physical object such as a USB flash drive into the computing device, there are various other ways that to enable a portable physical object to communicate with the computing device (e.g., through NFC).

User interaction with respect to the set of Web services is tracked 510. In some embodiments, the user interaction with respect to the set of computing resources associated with the set of Web services includes any operations performed with respect to each of the set of Web services. The user interaction may also include successful and/or failed authentication attempts made by the user. The user interaction with respect to the set of Web services is stored into a record or data store (e.g., portable storage 112 shown in FIG. 1) on the portable physical object 515. Some embodiments may store the user interaction in a log where each user interaction is recorded in a single entry. Access to the record is enabled 520.

Some embodiments enable the user to view the record in order to verify certain activities. In some embodiments, the administrator may desire to review the record (e.g., usage quotas) for various purposes such as for fraud purposes, for statistical data gathering purposes, forensic analysis, etc. The user interaction with respect to the set of Web services may be tracked and recorded on a tamper-evident device, such as the portable storage device. In some embodiments, whether particular requests were made may be verified by the record stored on the tamper-evident device. This is suitable for highly secure applications as one may observe requests made by third parties using the record that is tamper-evident of the interactions performed. The customer access to the set of Web services may be anonymous without requiring the customer to register personal information with the set of Web services prior to usage.

In some embodiments, the portable physical object is sold to the customer on a prepaid basis, where usage of the set of computing resources associated with the set of Web services is limited to an amount prepaid by the customer. The user may register personal information to be associated with the portable physical object such that the customer may convert a prepaid mode of the portable physical object to a post-pay mode. This enables the user to recharge an account associated with the portable physical object. Further, some embodiments enable the user to query the portable physical object to determine current usage and an amount of money remaining on the portable physical object from the amount prepaid by the customer.

Some embodiments enable the user to register the account to obtain a security credential such that the user can recover account information associated with the portable physical object upon losing the portable physical object. Further, a set of credentials may be prepackaged onto the portable physical object for authentication purposes. The set of credentials may include at least one of a symmetric key, an asymmetric key, a certificate, an RSA key, etc.

Figure 6:
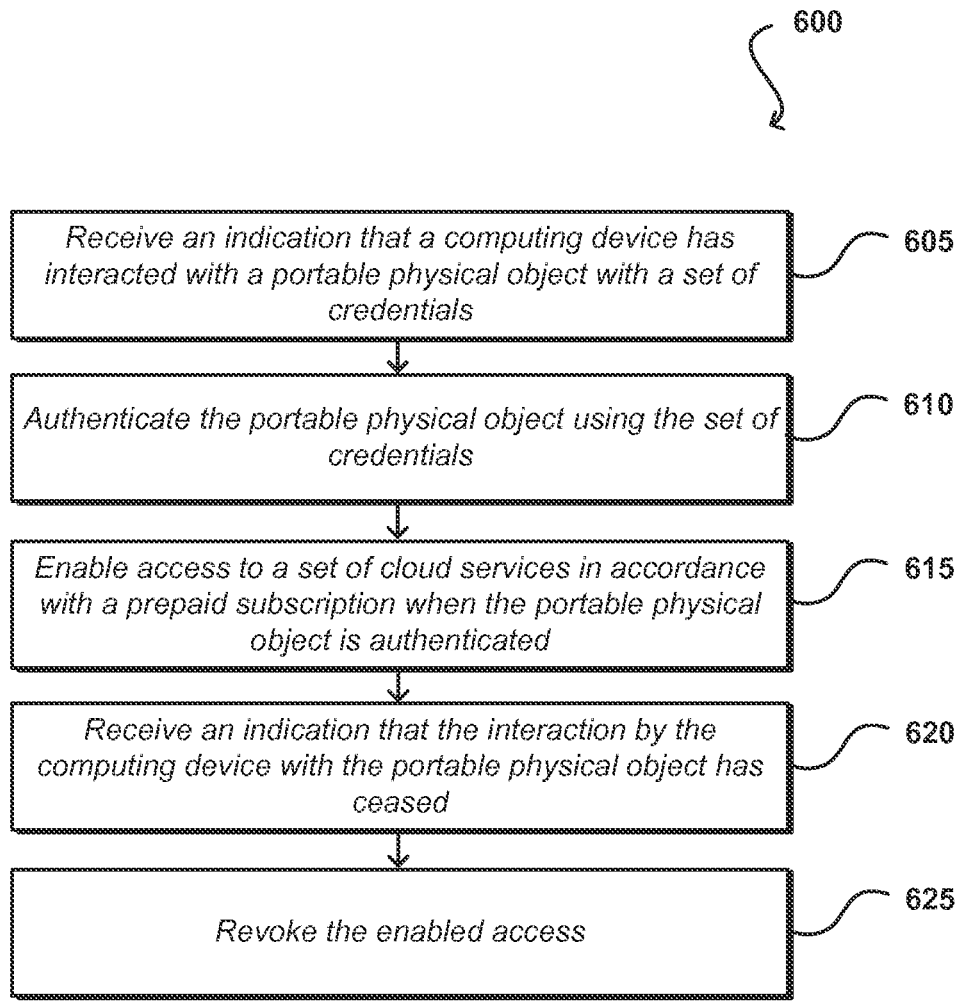
FIG. 6 illustrates an example process for enabling access to one or more computing resources in accordance with one embodiments.

FIG. 6 illustrates an example process 600 for enabling access to one or more computing resources in accordance with one embodiments. In this example, an indication that a user computing device has interacted with a portable physical object that includes a storage medium having stored thereon a set of credentials is received over a network 605. The indication may be a signal received upon the user inserting a USB flash drive into the computing device in some embodiments. In some embodiments, the indication may be a signal received upon the portable physical object being within a threshold distance with the user computing device such that communication is established between the portable physical object and the computing device.

The portable physical object is authenticated using the set of credentials 610. When the portable physical object is successfully authenticated, access to the set of Web services is enabled in accordance with a subscription associated with a prepaid amount for the portable physical object 615. In some embodiments, the subscription includes one or more usage limits with respect to the usage of the set of computing resources associated with the set of Web services. An indication that the interaction by the user computing device with the portable physical object has ceased is received 620. The enabled access is revoked as a result of receiving the indication that the interaction by the user computing device with the portable physical object has ceased 625.

In one embodiment, all communication channels to the host servers are secure using a hypertext transfer protocol over a secure socket layer (SSL). Each application server can be started using scripts at bootup of an instance. Before starting the application server engine, a script can be executed that generates a self-signed certificate and installs the certificate to enable the SSL communication channel(s). SSL communication is used in one embodiment for encrypting the communication channel and not for client authentication. Client authentication is instead achieved with a public/private key signature embedded in each request, such that in one embodiment all clients sign query string parameters using a private key. This signature can be validated by a custom interceptor, which can be deployed with the application server for the host manager. Secure information and credentials (such as private keys) can be stored in an appropriate keystore, which can provide for functionality such as key management and rotation.

Another aspect that can be handled by taking advantage of various frameworks includes the management of various security aspects, such as secure keys and user credentials. Secure information such as secure keys and passwords can be stored using a secure key management system or service, such as is described in co-pending U.S. patent application Ser. No. 12/372,597, Feb. 17, 2009, and entitled "Encryption Key Management," which is hereby incorporated herein by reference.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Figure 7:
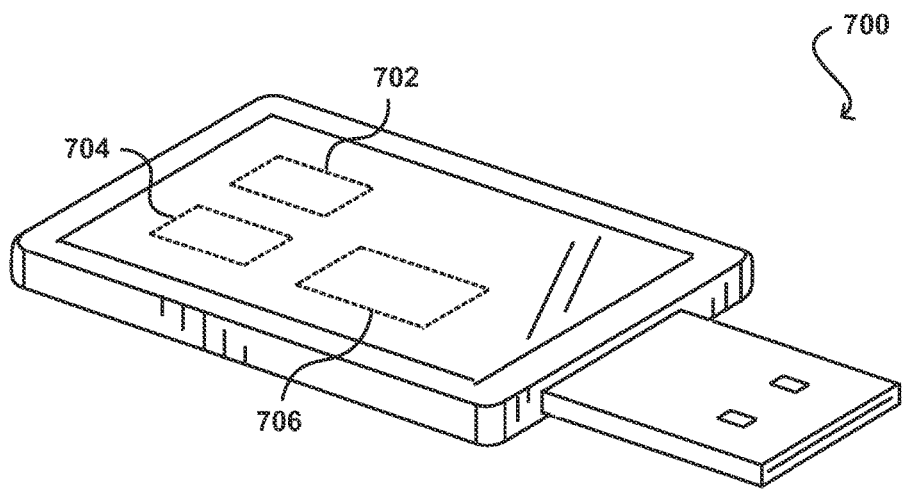
FIG. 7 illustrates an example portable physical object or device that can be used in accordance with various embodiments.

FIG. 7 illustrates an example portable physical object or device 700 that can be used in accordance with various embodiments. Although a portable physical object (e.g., a USB flash drive) is shown, it should be understood that any electronic device or object capable of storing and providing data and/or receiving and processing input can be used in accordance with various embodiments discussed herein. These objects or peripheral devices can include, for example, smartcards, and SD cards, or other similar objects that are capable of holding data, among others. Further, interfaces other than the USB interface for connecting peripheral devices to a computing device may include the Thunderbolt interface, FireWire interface, etc.

In this example, the portable physical object 700 has a storage component 702 for storing user data (e.g., web service requests, audit logs). The storage component can include many types of memory. In some embodiments, the portable physical object 700 also has a processor 704 for executing instructions that can be stored in the storage component 702. The device also includes a power system 706, such as may include a battery operable to be recharged through conventional plug-in approaches, or through other approaches such as capacitive charging through proximity with a power mat or other such device. The power system may include radio frequency identification tags that harness energy from radio frequency waves (e.g., active radio frequency identification technology). Various other elements and/or combinations are possible as well within the scope of various embodiments.

Figure 8:
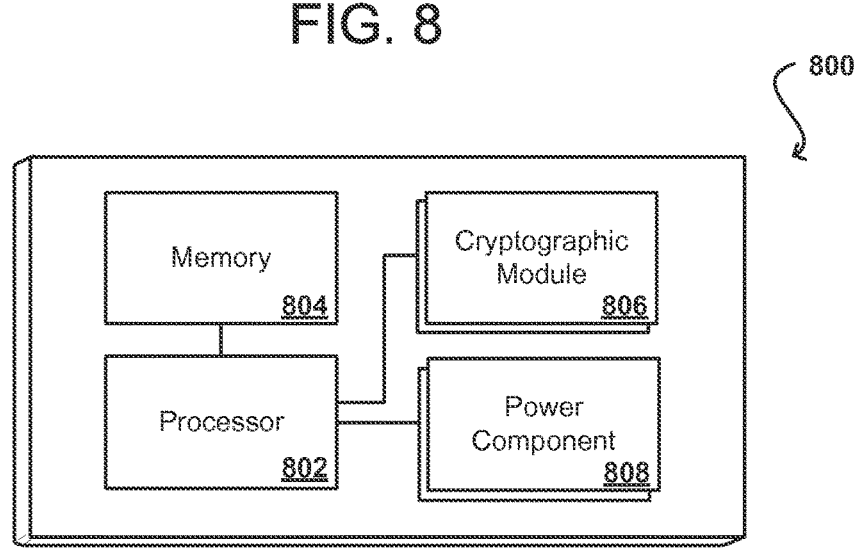
FIG. 8 illustrates an example set of basic components of an portable physical device shown in FIG. 7.

In order to provide functionality such as that described with respect to FIG. 7, FIG. 8 illustrates an example set of basic components of an portable physical device 800. In this example, the device includes at least one processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. In some embodiments, the device may include some type of display element, such as a touch screen, electronic ink (e-ink), organic light emitting diode (OLED) or liquid crystal display (LCD), although some objects and devices might convey information via other means.

A cryptographic module 806 is included in this example that may be part of the processor in some embodiments. The cryptographic module may utilize a set of credentials stored in the memory of the portable physical device to enable one or more Web services to authenticate the portable physical object, to encrypt and/or sign data to be sent to one or more Web services, to encrypt a subset of the set of credentials for transmission to one or more Web services, etc. In some embodiments, the cryptographic module may be part of an application (e.g., a mobile phone or smartphone application) on a mobile device. The example device or object includes various power components 808 known in the art for providing power to the device or object, which can include capacitive charging elements for use with a power pad or similar device as discussed elsewhere herein. In some embodiments, the device can include at least one I/O device able to receive input from a computing device (e.g., a smartphone, an electronic book reader, a tablet computer, a user desktop computer, a notebook computer, a personal data assistant, a video gaming console, a television set top box, and a portable media player, among others.) or a user. These I/O devices could even be connected by a wireless infrared or Bluetooth or other link as well in some embodiments.

Figure 9:
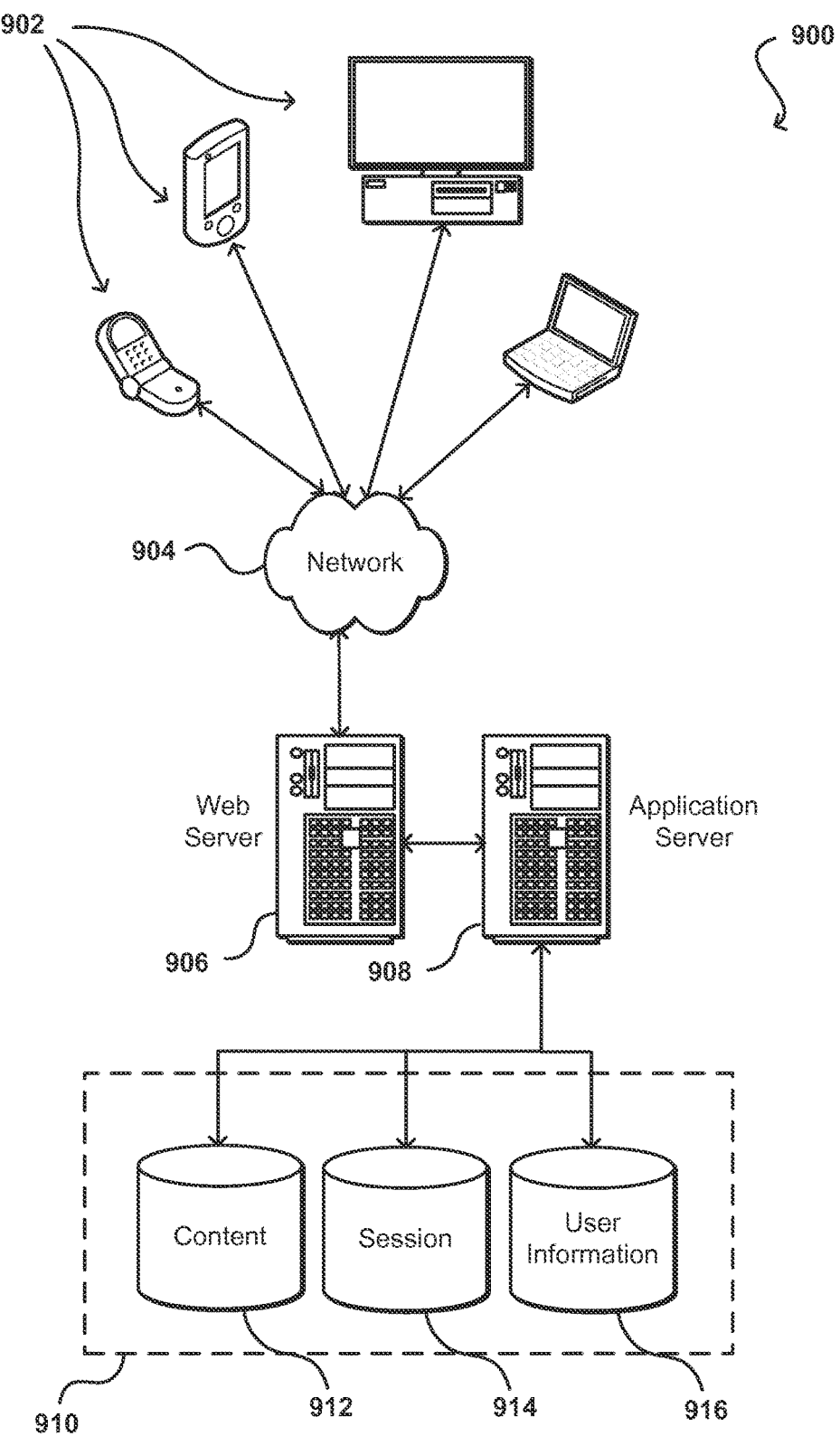
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of storing a secure audit log of user interaction with respect to a set of computing resources, comprising:
    enabling, via usage of a computer comprising a first memory, a user to access the set of computing resources;
    collecting user interaction data based at least in part on tracking the user interaction with respect to the user accessing the set of computing resources;
    storing the user interaction data with respect to the set of computing resources onto a portable physical object comprising a second memory, the portable physical object comprising a signing module stored in the second memory for generating a security credential to be stored in the second memory, the security credential for accessing the set of computing resources, and the portable physical object comprising a processor for executing the signing module to generate the security credential;
    enabling the user of the portable physical object to recover account information associated with the portable physical object by using the security credential; and
    sending a portion of the user interaction data to a separate data store among the set of computing resources, the portion of the user interaction data comprising first user interaction recorded beyond a threshold period of time prior to a current time such that second user interaction recorded within a recent period of time is kept locally on the portable physical object,
    wherein the set of computing resources is accessible across a network through an application programming interface (API) or other interface.

2. The method of claim 1, further comprising:
    receiving an indication that the portable physical object is no longer communicatively coupled to the computer; and
    revoking the enabled access as a result of receiving the indication that the portable physical object is no longer communicatively coupled to the computer.

3. The method of claim 1, wherein the portable physical object is sold to the user on a prepaid basis, wherein usage of the set of computing resources is limited to a usage amount associated with an amount prepaid by the user.

4. The method of claim 1, further comprising:
    prepackaging a set of credentials comprising at least the security credential to be associated with the portable physical object, the set of credentials including at least one of a symmetric key, an asymmetric key, a certificate, or a public-key cryptography key, wherein access to the set of computing resources is enabled upon authentication of the portable physical object using the set of credentials.

5. The method of claim 1, wherein access to the second memory can be obtained by an administrator of the set of computing resources.

6. The method of claim 1, wherein successful and/or failed requests made using the portable physical object are tracked and stored on the portable physical object.

7. The method of claim 1, further comprising:
    identifying that the signing module executed on the portable physical object generated a digital signature utilizing the security credential; and
    receiving a request to access the set of computing resources, wherein the request comprises the digital signature, and wherein enabling the access to the set of computing resources is based in part on the request comprising the digital signature.

8. The method of claim 1, further comprising:
    providing the user interaction data to a page, wherein the user is enabled to view the user interaction data via the page.

9. A non-transitory computer-readable storage medium including instructions for storing a secure audit log of user interaction data with respect to a set of computing resources, the instructions when executed by a processor of a computing device cause the computing device to:
    enable, via usage of a computer comprising a first memory, a user to access the set of computing resources;
    obtain access to the set of network-based computing resources when a portable physical object comprising a second memory is authenticated using a set of credentials that are stored in the second memory on the portable physical object, the portable physical object comprising security credential for accessing the set of network-based computing resources, portable physical object comprising a processor that executes a signing module to generate the security credential;
    enable the user of the portable physical object to recover account information associated with the portable physical object by using the security credential;
    perform a user interaction with respect to the set of computing resources, the portable physical object configured to track the user interaction; and
    store the user interaction data recording the user interaction with respect to the set of computing resources into the second memory on the portable physical object,
    wherein the set of computing resources is accessible across a network through an application programming interface (API) or other interface.

10. The non-transitory computer-readable storage medium of claim 9, wherein the set of computing resources includes at least one of storage services, email services, backup services, or virtual computing services.

11. The non-transitory computer-readable storage medium of claim 9, wherein the user interaction with respect to the set of computing resources includes successful and/or failed web service requests made using the portable physical object.

12. The non-transitory computer-readable storage medium of claim 9, wherein the set of credentials comprising at least the security credential are prepackaged onto the portable physical object, the set of credentials including at least one of a symmetric key, an asymmetric key, a certificate, or a public-key cryptography key, wherein the set of computing resources is accessible upon authentication of the portable physical object using the set of credentials.

13. The non-transitory computer-readable storage medium of claim 9, wherein the set of computing resources may be accessed in accordance with a prepaid subscription associated with the portable physical object, the prepaid subscription having one or more usage limits with respect to usage of the set of computing resources.

14. The non-transitory computer-readable storage medium of claim 13, wherein the instructions when executed further cause the computing device to:
enable access to information relating to usage of the set of computing resources, the information including current and/or past usage of the set of computing resources and an amount of value remaining on the portable physical object from an amount prepaid by the user in accordance with the prepaid subscription.

15. A portable physical device, comprising:
a processor; and
a memory device comprising a first memory that comprises instructions that, when executed by the processor, cause the portable physical device to:
provide a set of credentials from the first memory of the memory device to enable authentication of the portable physical device associated with a prepaid subscription;
upon authentication of the portable physical device, enable access to a set of computing resources in accordance with the prepaid subscription via usage of a computer comprising a second memory, the portable physical device comprising a security credential stored in the first memory for accessing the set of computing resources, and the portable physical device comprising a processor that executes a signing module to generate the security credential;
enable a user of the portable physical device to recover account information associated with the portable physical device by using the security credential, the set of computing resources accessible across a network through an application programming interface (API) or other interface and the prepaid subscription indicating one or more usage limits with respect to the set of computing resources;
collect user interaction data based at least in part on tracking a user interaction with respect to the user accessing the set of computing resources;
store the user interaction data recording the user interaction with respect to the set of computing resources into the first memory on the portable physical device; and
provide access to the user interaction data recording the user interaction in the first memory.

16. The portable physical device of claim 15, wherein the user interaction with respect to the set of computing resources tracked includes changes made to one or more computing resources in the set of computing resources and successful and/or failed web services requests.

17. The portable physical device of claim 15, wherein the instructions when executed further cause the portable physical device to:
prepackage the set of credentials comprising at least the security credential to be associated with the portable physical device, the set of credentials including at least one of a symmetric key, an asymmetric key, a certificate, or a public-key encryption key.

18. The portable physical device of claim 15, wherein the instructions when executed further cause the portable physical device to:
enable the user to create a password for accessing an account associated with the portable physical device.

19. The portable physical device of claim 15, wherein the user interaction with respect to the set of computing resources is a web service request that uses one or more of the set of computing resources.

20. The portable physical device of claim 15, wherein access to the set of computing resources is enabled without requiring the user to register an account with the set of computing resources and allowing the user to remain anonymous.

* * * * *